W. WING.
TRAP.
APPLICATION FILED OCT. 24, 1918.
1,299,086.
Patented Apr. 1, 1919.
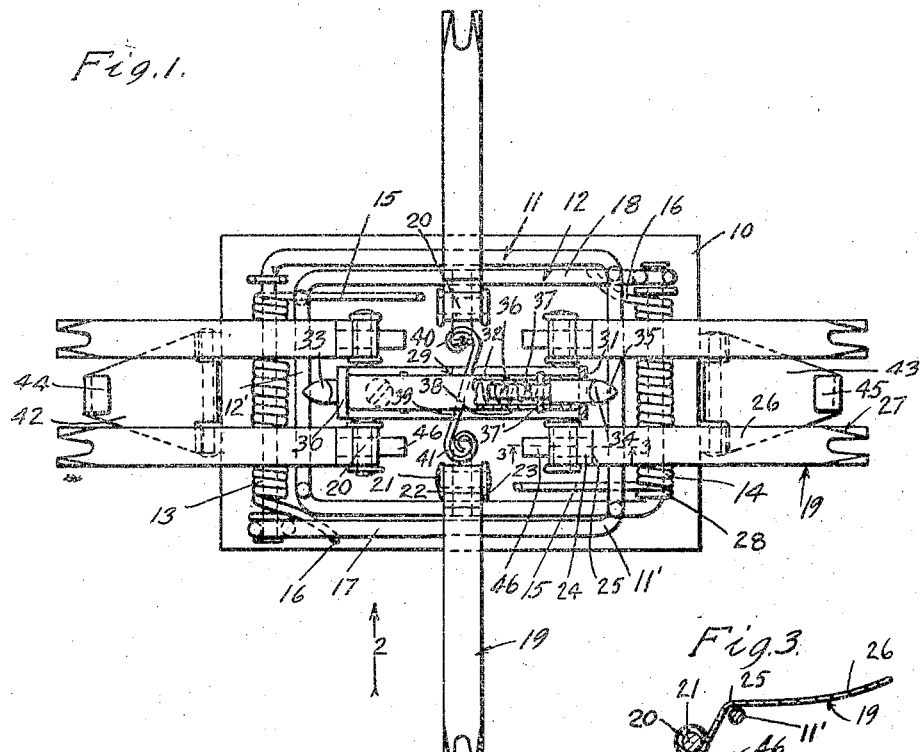
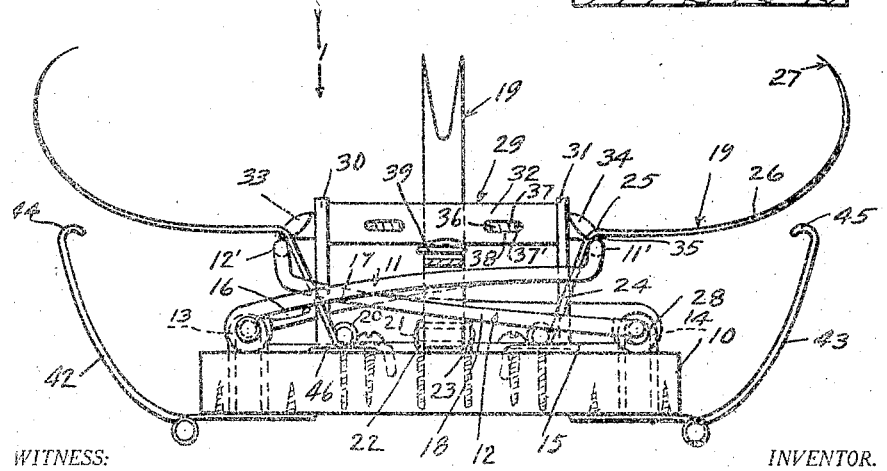
WITNESS:
INVENTOR.
Wun Wing.
BY Hazard & Miller
ATTORNEYS.

UNITED STATES PATENT OFFICE.

WUN WING, OF SANTA BARBARA, CALIFORNIA.

TRAP.

1,299,086.   Specification of Letters Patent.   Patented Apr. 1, 1919.

Application filed October 24, 1918. Serial No. 259,535.

*To all whom it may concern:*

Be it known that I, WUN WING, a citizen of the United States, residing at Santa Barbara, in the county of Santa Barbara and State of California, have invented new and useful Improvements in Traps, of which the following is a specification.

My invention relates to a trap and more particularly to an animal trap.

The object of my invention is to provide a trap for catching animals which is positive in its action and unfailing in its operation.

With this and other objects in view, my invention consists in the construction, combination and arrangement of parts hereinafter described and claimed.

In the accompanying drawings which form a part of this specification,

Figure 1 is a plan view of a trap, in its set position, embodying the principles of my invention, as seen looking in the direction indicated by arrow 1 in Fig. 2.

Fig. 2 is a view in side elevation of the trap shown in Fig. 1 as seen looking in the direction indicated by arrow 2 in Fig. 1, one of the arms being broken away to show the trigger device.

Fig. 3 is an enlarged sectional detail on line 3—3 of Fig. 1, illustrating the action of the springs which hold the arms in their extended position.

As shown in the figures, the trap consists of a base block 10 upon which are pivotally fixed two rectangular loops 11 and 12 in such a way that each is horizontally pivoted at one of its ends on opposite ends of the base block, the other end being free to move away from the base block. The loops are made of equal length but the outer loop 11 is made wider than the inner loop 12 so that the sides of the narrower loop may pass freely within the sides of the outer loop. The free end 11' of the outer loop therefore overlaps the inner loop.

Stiff coil springs 13 and 14 embrace the pivoted ends of loops 11 and 12 respectively, one end 15 of the coil spring 14 being rigidly fixed into the base block while the other end 16 is hooked under the side bar 17 of loop 11 and the side bar 18 of loop 12. The end bars 11' and 12' of loops 11 and 12 respectively are offset upwardly from the plane of the loops by bends in their side bars. The tension of the springs is such as to have a tendency to lift the loops upwardly and throw them outwardly from the ends of the base block. Curved arms 19 are hinged to the base block 10 within the loops 11 and 12, so that in their extended position when the trap is set they rest upon the loops 11 and 12 near their hinged end. In the trap illustrated I have shown a pair of parallel arms at each end of the base block and one arm at each side. These arms are preferably formed of band metal and have their lower ends formed into bearings 20 through which a pivot pin 21 extends, said pivot pins turning in screw eyes 22 and 23 screwed into the base block. Each arm has a straight portion 24 next to the hinge, a bend 25 where it rests upon the loop, and a curved portion 26 which extends outwardly and upwardly from the loop bars and terminates in a pair of claws 27. The ends of loops 11 and 12 are held to the base plate by pivot staples 28 driven in to the base block. A trigger member 29 is longitudinally mounted in the middle of the base block upon standards 30 and 31 fixed to the base block. The trigger member consists of a sleeve 32 and latch dogs 33 and 34, protruding from its ends. It extends between standards 30 and 31, the latch dogs extending through the standards and serving as pivot pins upon which the trigger member turns in the standards. The outer ends of the dogs are beveled and rounded to a point 35, on the under side of the trigger and have their inner ends 36 reduced to receive a compressed coil spring 37 extending between them within the sleeve. Cross pins 37' are fixed through the dogs within the sleeve at a short distance from its ends, said cross pins extending through slots 38 formed in the side of the sleeve. The purpose of these cross pins and slots is to hold the dogs from rotating within the sleeve and at the same time to limit their longitudinal movement outwardly.

Attached to the under side of the trigger sleeve transversely to it is a bar 39 terminating in bait hooks 40 and 41. Arms 42 and 43 whose outer ends terminate in safety hooks 44 and 45 are hinged to the ends of the base plate. These are adapted to hook over the free ends of the loops to hold the trap in an opened position when it is to be baited or a captured animal is to be removed. Under the pivoted ends of the arms fixed in recesses cut in the base plate are flat springs 46 which frictionally engage with the bearings of the arms to hold the parts from rattling.

Operation: In setting the trap the free ends of the links are pulled downwardly toward the ends of the base and hooked under safety hooks 44 and 45. The bait bar is then twisted into a horizontal position under the trigger sleeve which brings the pointed ends of the latch dogs 33 and 34 in position to engage the loop bars 11′ and 12′. The bait is then fixed to the bait hooks and the free ends of the loops are pressed downwardly past the dogs 33 and 34. These spring inwardly allowing the loop bars to pass and then are forced outwardly so that the lower straight edge of the dog engages with the upturned loop ends to hold them in their set position. The arms are now opened outwardly so that they rest upon the ends and sides of the links and the safety arms are pulled down into a horizontal position. The trap is now set and a pull on either one of the bait hooks will twist the trigger sleeve and with it the latch dogs protruding therefrom so that the beveled surface of the dog comes in contact with the loop bar. The upward force exerted by the loop bar against the beveled surface of the dog due to the coil springs around the pivoted ends of the loops forces the dogs inwardly against the coil spring within the sleeve and allows the free ends of the loops to pass upwardly. This upward movement carries the arms resting upon them upwardly and inwardly until their claws interlock over the center of the trap imprisoning the animal, if it be a small one, or grasping its head, if it be a large one. In removing the captured animal, the free ends of the links are pressed downwardly and brought into engagement with the safety hooks as in setting the trap.

While I have shown a trap having six arms, it is evident that a smaller or larger number may be used, and that various other changes in construction and combination of parts may be made by those skilled in the art without departing from the spirit of my invention as claimed.

I claim:

1. An animal trap comprising a base block, a pair of loop members pivotally attached thereto, actuating springs attached to said loop members and said base block, a multiplicity of coöperative arms also pivoted to said base block in operative relation to said loop members, and trigger controlled mechanism for holding said loops in a locked position when the trap is set and for quickly releasing them when the trap is operated.

2. An animal trap comprising a base block, a pair of rectangular loop members each having one of its ends horizontally pivoted to said base block, an actuating spring fixed to each of said loop members and said base block, a multiplicity of arms horizontally pivoted to said base block in operative relation to said loop members, each of said arms terminating in a pair of claws, two standards fixed to the middle of said base block in longitudinal alinement with the middle of the block, a trigger sleeve extending between said standards and pivotally mounted in them, latch dogs protruding from the ends of said trigger sleeve and adapted to engage said loop members in their set position, bait hooks fixed to said trigger sleeve and safety hooks hinged to the ends of said base plate and adapted to engage and hold said loops in an intermediate position between the set position and the operated position.

In testimony whereof I have signed my name to this specification.

WUN WING.